United States Patent [19]

Nihira et al.

[11] Patent Number: 5,589,097
[45] Date of Patent: Dec. 31, 1996

[54] METHOD FOR PREPARING MAGNETITE MAGNETIC POWDER

[75] Inventors: Yoshito Nihira, Chiba, Japan; Haoren Zhuang, Cincinati, Ohio; Takeshi Nomura, Chiba, Japan

[73] Assignee: TDK Corporation, Tokyo, Japan

[21] Appl. No.: 362,865

[22] Filed: Dec. 23, 1994

[30]  Foreign Application Priority Data

Dec. 24, 1993 [JP] Japan .................................... 5-347945
Dec. 27, 1993 [JP] Japan .................................... 5-353918
May 25, 1994 [JP] Japan .................................... 6-135004

[51] Int. Cl.$^6$ ................................................. C04B 35/26
[52] U.S. Cl. ...................................... 252/62.59; 423/632
[58] Field of Search ........................ 423/632; 252/62.59

[56]  References Cited

U.S. PATENT DOCUMENTS 4,436,681  3/1984  Barczak et al. ......................... 423/433

FOREIGN PATENT DOCUMENTS

| 641373 | 5/1962 | Canada ................................. 423/632 |
| 49-35520 | 9/1974 | Japan . |
| 50-133992 | 10/1975 | Japan . |
| 61-72630 | 4/1986 | Japan . |

OTHER PUBLICATIONS

Chamical Abstracts citation 94:177423, Shibayama et al, 1980 no month.

Chemical Abstracts citation 90:189226, JP 54–2993, Oct. 1, 1979.

"Development Studies On Thermochemical Cycles For Hydrogen Production", pp. 8.8–.108, D. Van Valzen, et al. World Hydrogen Energy Conf., vol. 1, No. 1, 1976 no month.

"Preparation Of Magnetite Magnetic Powder By Thermal Decomposition", Autumn, 1994, no month Yoshito Nihira, et al.

*Primary Examiner*—Melissa Bonner
*Attorney, Agent, or Firm*—Oblon, Spivak, McClelland, Maier & Neustadt, P.C.

[57]  ABSTRACT

Ferrous chloride is used as a starting material and roasted in a steam-containing atmosphere for pyrolysis to prepare a magnetite magnetic powder having a saturation magnetization σs of 82–92 emu/g and a magnetite phase content of at least 90 wt. %. Prior to roasting, the ferrous chloride may be pre-treated by heat treating it at a low temperature in a non-oxidizing atmosphere, cooling it down to a predetermined temperature, and then exposing it to an oxygen-containing atmosphere. A mixture of ferrous chloride and ferric chloride may also be used as the starting material. These methods can produce magnetite magnetic powder having improved magnetic properties through fewer steps in a simple and easy manner.

23 Claims, 7 Drawing Sheets

METHOD FOR PREPARING MAGNETITE MAGNETIC POWDER

BACKGROUND OF THE INVENTION

1. Field of the Invention

This invention relates to a method for preparing magnetite magnetic powder.

2. Background Art

Magnetite magnetic powder is typically used in a magnetic toner for an electrophotographic process including copying machines, laser printers and plain paper facsimile machines.

Prior art industrial methods for preparing magnetite magnetic powder include a wet process and a solid phase process. The method for preparing magnetite magnetic powder according to a wet process is by adding an alkali to a ferrous chloride solution to form ferrous hydroxide and passing an oxidizing gas into the alkaline solution to oxidize the ferrous hydroxide therein, thereby producing magnetite (see JP-B 35520/1974). The method for preparing magnetite according to a solid phase process is by subjecting hematite to a reducing heat treatment with a reducing gas such as hydrogen, thereby producing magnetite (see JP-A 72630/1986).

These methods are said to have the advantage that pure spinel single phase magnetite can be produced because the oxidizing or reducing atmosphere can be controlled. However, these methods have the drawback that the manufacture cost is increased because of many steps.

Meanwhile, for utilizing iron chloride in spent pickling solution resulting from hydrochloric acid pickling of steel strips in the steel making industry, it is a common practice to produce iron oxide by roasting or pyrolyzing the iron chloride in air. The roasting or pyrolyzing technique generally includes an atomizing roaster technique of atomizing a waste hydrochloric acid pickling solution from the roaster top, effecting pyrolysis in the roaster, and collecting iron oxide from the roaster bottom and a fluidized bed roaster technique of atomizing a waste hydrochloric acid solution into a fluidized bed held at a certain temperature where pyrolysis is effected and collecting iron oxide from the roaster top.

The roasting techniques have the advantages that precipitating, grinding and other steps can be omitted and the manufacture cost of iron oxide can be lowered because a spent pickling solution of iron chloride is utilized. However, since a substantial portion of iron chloride is oxidized in air so that the major phase consists of hematite, it is difficult to synthesize magnetite powder by the existing roasting techniques.

On the other hand, the following steps were proposed as a method for producing hydrogen through thermochemical decomposition of water based on iron chloride group cycling ("Development studies on the thermochemical cycles for hydrogen production", D. Van Velzen, World Hydrogen Energy Conf., Vol. 1st, No. 1, pages 8A.83-8A.108, 1976).

$$6FeCl_2 + 8H_2O \rightarrow 2Fe_3O_4 + 12HCl + 2H_2 \quad (1)$$

$$2Fe_3O_4 + 12HCl + 3Cl_2 \rightarrow 6FeCl_3 + 6H_2O + O_2 \quad (2)$$

$$6FeCl_3 \rightarrow 6FeCl_2 + 3Cl_2 \quad (3)$$

In the technique described in this report, ferrous chloride reacts with steam to produce magnetite as an intermediate product of the process.

However, focusing the production of hydrogen in reaction formula (1), the technique described in this report studies the relationship of a reaction rate and a reaction conversion rate (hydrogen production rate) to a flow rate of steam and a reaction temperature. Except that magnetite is produced as an intermediate product, the report lacks the specific description of considerations from the aspect of magnetite production including reaction conditions and the content of magnetite phase in the intermediate product.

As mentioned above, a method of effectively producing magnetite through pyrolysis by utilizing ferrous chloride was not available in the prior art. Although the above-cited report concerning the research work of producing hydrogen through thermochemical decomposition of water based on iron chloride group cycling discloses that magnetite is produced as an intermediate product during decomposition of water, the relationship of a magnetite phase content to reaction conditions is not considered at all.

DISCLOSURE OF THE INVENTION

Therefore, an object of the present invention is to provide a method for preparing a magnetite magnetic powder which can produce a magnetite magnetic powder having improved magnetic properties through fewer steps in a simple and easy manner while using ferrous chloride as a starting material.

Another object of the present invention is to provide a method for preparing a magnetite magnetic powder which can produce a magnetite magnetic powder having improved magnetic properties and an increased specific surface area or a reduced mean particle size through fewer steps in a simple and easy manner while using ferrous chloride as a starting material.

A further object of the present invention is to provide a method for preparing a magnetite magnetic powder which can produce a magnetite magnetic powder having improved magnetic properties through fewer steps in a simple and easy manner while using ferrous chloride and ferric chloride as a starting material.

These and other objects are achieved by the present invention defined by the following claims (1) to (26).

(1) A method for preparing a magnetite magnetic powder comprising the steps of:

using ferrous chloride as a starting material, and roasting the material in a steam-containing atmosphere for pyrolysis thereof, thereby forming a magnetite magnetic powder having a saturation magnetization $\sigma s$ of 82 to 92 emu/g and a magnetite phase content of at least 90% by weight.

(2) A method for preparing a magnetite magnetic powder according to (1) wherein the roasting step is effected within the range defined and encompassed by a tetragon having four points A, B, C and D given by the inlet steam pressure of the atmosphere and heat treating temperature as A: 1000° C., 760 mmHg, B: 500° C., 760 mmHg, C: 750° C., 200 mmHg, and D: 530° C., 200 mmHg.

(3) A method for preparing a magnetite magnetic powder according to (2) wherein the roasting step is effected within the range defined and encompassed by a tetragon having four points E, F, G and H given by the inlet steam pressure of the atmosphere and heat treating temperature as E: 550° C., 760 mmHg, F: 800° C., 760 mmHg, G: 550° C., 600 mmHg, and H: 600° C., 600 mmHg.

3

(4) A method for preparing a magnetite magnetic powder according to (1) wherein said atmosphere consists essentially of a non-oxidizing gas and steam.

(5) A method for preparing a magnetite magnetic powder according to (1) wherein said ferrous chloride as the starting material is ferrous chloride in a spent hydrochloric acid pickling solution, ferrous chloride obtained by reducing a solution of ferric chloride with metallic iron, or ferrous chloride obtained by dissolving metallic iron in hydrochloric acid.

(6) A method for preparing a magnetite magnetic powder according to (1) wherein said roasting step is effected by an atomizing roaster technique, a fluidized bed roaster technique, a tunnel kiln technique, or a rotary kiln technique.

(7) A method for preparing a magnetite magnetic powder according to (1) wherein said magnetite magnetic powder contains up to 600 ppm of residual chlorine.

(8) A method for preparing a magnetite magnetic powder according to (1) wherein said magnetite magnetic powder is used in a magnetic toner.

(9) A method for preparing a magnetite magnetic powder comprising the steps of:

using ferrous chloride as a starting material, pre-treating the material by heat treating it at a low temperature in a non-oxidizing atmosphere, cooling it down to or below a predetermined temperature, and exposing it to an oxygen-containing atmosphere after the predetermined temperature is reached, and thereafter roasting the pre-treated material in a steam-containing atmosphere for pyrolysis thereof, thereby forming a magnetite magnetic powder having a saturation magnetization σs of 82 to 92 emu/g and a magnetite phase content of at least 90% by weight.

(10) A method for preparing a magnetite magnetic powder according to (9) wherein the low-temperature heat treatment in the pre-treating step is at a temperature in the range of 250° to 400° C.

(11) A method for preparing a magnetite magnetic powder according to (9) wherein the cooling step is effected down to at least 200° C.

(12) A method for preparing a magnetite magnetic powder according to (9) wherein the roasting temperature is in the range of 500° to 1,000° C.

(13) A method for preparing a magnetite magnetic powder according to (9) wherein said roasting step is effected with the inlet steam pressure of the atmosphere being set at 200 to 760 mmHg.

(14) A method for preparing a magnetite magnetic powder according to (9) wherein said atmosphere consists essentially of a non-oxidizing gas and steam.

(15) A method for preparing a magnetite magnetic powder according to (9) wherein said ferrous chloride as the starting material is ferrous chloride in a spent hydrochloric acid pickling solution, ferrous chloride obtained by reducing a solution of ferric chloride with metallic iron, or ferrous chloride obtained by dissolving metallic iron in hydrochloric acid.

(16) A method for preparing a magnetite magnetic powder according to (9) wherein said roasting step is effected by an atomizing roaster technique, a fluidized bed roaster technique, a tunnel kiln technique, or a rotary kiln technique.

(17) A method for preparing a magnetite magnetic powder according to (9) wherein said magnetite magnetic powder has a specific surface area of 0.8 to 3.0 m²/g.

(18) A method for preparing a magnetite magnetic powder according to (9) wherein said magnetite magnetic powder contains up to 600 ppm of residual chlorine.

4

(19) A method for preparing a magnetite magnetic powder according to (9) wherein said magnetite magnetic powder is used in a magnetic toner.

(20) A method for preparing a magnetite magnetic powder comprising the steps of:

using a mixture of ferrous chloride and ferric chloride as a starting material, and roasting the material in a steam-existing atmosphere for effecting pyrolysis reaction to form a magnetite magnetic powder.

(21) A method for preparing a magnetite magnetic powder according to (20) wherein in said mixture, the compositional ratio of ferrous chloride to ferric chloride ranges from 25/75 to 75/25 in molar ratio.

(22) A method for preparing a magnetite magnetic powder according to (20) wherein the roasting temperature is in the range of 430° to 800° C.

(23) A method for preparing a magnetite magnetic powder according to (20) wherein said roasting step is effected with the inlet steam pressure of the atmosphere being set at 200 to 760 mmHg.

(24) A method for preparing a magnetite magnetic powder according to (20) wherein said atmosphere used in said roasting step consists essentially of a non-oxidizing gas and steam.

(25) A method for preparing a magnetite magnetic powder according to (20) wherein said magnetite magnetic powder has a saturation magnetization σs of 82 to 92 emu/g, a Hc of 60 to 160 Oe, a specific surface area of 0.8 to 3.0 m²/g, and a resistance of at least $10^6$ Ω.

(26) A method for preparing a magnetite magnetic powder according to (20) wherein said magnetite magnetic powder is used in a magnetic toner.

ILLUSTRATIVE CONSTRUCTION OF THE INVENTION

In the development works of the present invention, supposing that production of satisfactory magnetite magnetic powder largely depends on a roasting temperature and a steam pressure in the atmosphere where ferrous chloride is pyrolyzed, we carried out a basic experiment as mentioned below.

Figure 1:
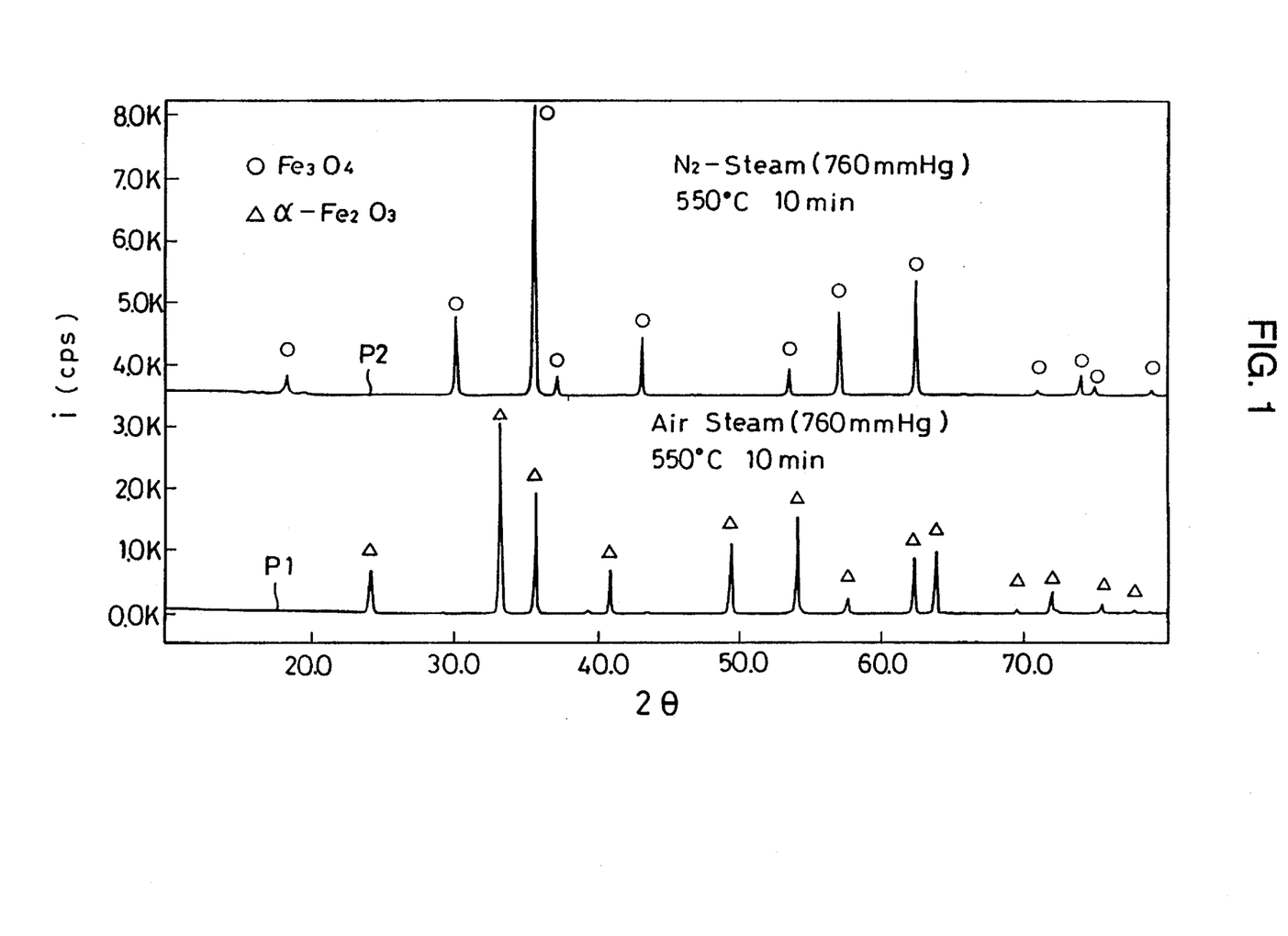
FIG. 1 is a diagram showing X-ray diffraction patterns of two samples obtained by roasting in air/steam and nitrogen/steam atmospheres.

First, samples 0-1, 0-2, and 0-3 were obtained by pyrolyzing $FeCl_2 \cdot 4H_2O$ of guaranteed reagent grade in three different atmospheres of air alone, air and steam introduced at a vapor pressure of 32 mmHg, and air and steam introduced at a vapor pressure of 760 mmHg, at a heating rate of 10° C./min., a roasting temperature of 550° C., and a holding time of 2 hours. Note that steam or the like was introduced into a roasting furnace prior to heating to fill the roaster therewith and continuously introduced and passed through the furnace during the process. The steam pressure was adjusted by controlling the temperature of steam under atmospheric pressure. The inlet steam pressure used throughout the specification indicates the pressure of steam when it is introduced into the heat treating furnace. The resulting products were analyzed by X-ray diffractometry. The pyrolytic conditions and the results of X-ray diffractometry are shown in Table 1. An X-ray diffraction pattern of sample 0-3 is depicted in FIG. 1 as pattern P1.

TABLE 1

| | | Heat treating conditions | | | |
| --- | --- | --- | --- | --- | --- |
| No. | Temp. (°C.) | Heating rate (°C./min.) | Holding time (hr.) | Atmosphere | Major phase |
| 0-1 | 550 | 10 | 2 | air | $\alpha\text{-}Fe_2O_3$ |
| 0-2 | 550 | 10 | 2 | air/steam (32 mmHg) | $\alpha\text{-}Fe_2O_3$ |
| 0-3 | 550 | 10 | 2 | air/steam (760 mmHg) | $\alpha\text{-}Fe_2O_3$ |
| 0-4 | 550 | 10 | 2 | $N_2$ | $FeCl_2$, $FeCl_2 \cdot 2H_2O$, unknown phase |
| 0-5 | 550 | 10 | 2 | $N_2$/steam (32 mmHg) | $Fe_3O_4$, $\alpha\text{-}Fe_2O_3$, FeO |
| 0-6 | 550 | 10 | 2 | $N_2$/steam (760 mmHg) | $Fe_3O_4$ |

As is evident from Table 1, it was found that no magnetite is produced when the roasting atmosphere is air alone or a mixture of air and steam.

Next, samples 0-4, 0-5, and 0-6 were obtained by using $N_2$ gas as a non-oxidizing gas instead of air, more particularly by pyrolyzing $FeCl_2 \cdot 4H_2O$ of guaranteed reagent grade in three different atmospheres of non-oxidizing gas or nitrogen gas alone, nitrogen gas and steam introduced at a vapor pressure of 32 mmHg, and nitrogen gas and steam introduced at a vapor pressure of 760 mmHg, with the remaining conditions unchanged. The resulting products were analyzed by X-ray diffractometry. The pyrolytic conditions and the results of X-ray diffractometry are shown above in Table 1. An X-ray diffraction pattern of sample 0-6 is depicted in FIG. 1 as pattern P2.

As is evident from Table 1, it was found that magnetite is not produced in an atmosphere of nitrogen gas alone, but in an atmosphere consisting of nitrogen gas and steam. In regard to the $N_2$/steam atmosphere, a comparison of samples 0-5 and 0-6 reveals that magnetite is more likely to form in an atmosphere having a higher steam pressure.

The present invention is predicated on the finding mentioned above. A method for preparing a magnetite magnetic powder according to a first aspect of the present invention is by using ferrous chloride as a starting material, and roasting the material in a steam-containing atmosphere, especially a non-oxidizing gas/steam atmosphere for pyrolysis thereof, obtaining a magnetite magnetic powder. The resulting magnetite magnetic powder has a magnetite phase content of at least 90% by weight and a saturation magnetization σs of 82 to 92 emu/g, possessing satisfactory magnetic properties. The preferred non-oxidizing gas is an inert gas such as nitrogen and argon.

Figure 2:
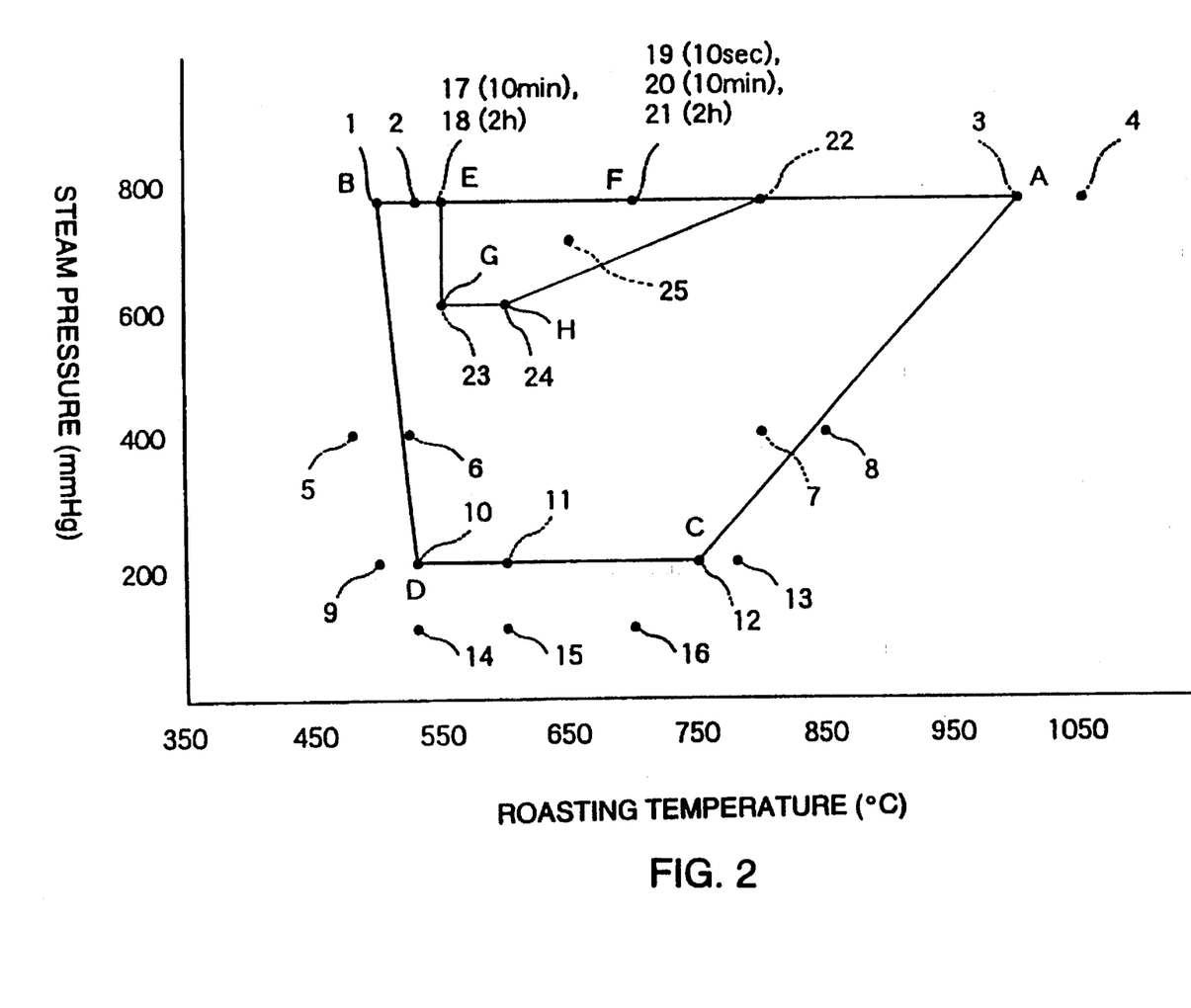
FIG. 2 is a graph showing roasting conditions in a preparation method according to the first aspect of the invention.

The roasting step is preferably effected within the range defined and encompassed by a tetragon having four points A, B, C and D plotted in a graph having an inlet steam pressure (mmHg) on the ordinate and a temperature (° C) on the abscissa and given by the inlet steam pressure of the atmosphere and roasting temperature as A: 1000° C., 760 mmHg, B: 500° C., 760 mmHg, C: 750° C., 200 mmHg, and D: 530° C., 200 mmHg (see FIG. 2). As mentioned above, steam or the like is introduced into a roasting furnace prior to heating to fill the furnace therewith and continuously introduced and passed through the furnace during the process. The steam pressure is adjusted by controlling the temperature of steam under atmospheric pressure, such that the steam pressure is 760 mmHg at 100° C., 600 mmHg at 95° C., 400 mmHg at 85° C. and 200 mmHg at 70° C., for example. The inlet steam pressure used herein indicates the pressure of steam when it is introduced into the roasting furnace. Outside the range, phases not contributing to magnetic properties such as wustite and hematite phases are produced in quantity. More preferably, the roasting step is effected within the range defined and encompassed by a tetragon having four points E, F, G and H given by the inlet steam pressure of the atmosphere and heat treating temperature as E: 550° C., 760 mmHg, F: 800° C., 760 mmHg, G: 550° C., 600 mmHg, and H: 600° C., 600 mmHg (see FIG. 2). Where roasting is effected within the range defined and encompassed by a tetragon having four points E, F, G and H, most advantageously a magnetic powder of single magnetite phase is obtained.

The ferrous chloride used as a starting material in the preparation method according to the first aspect of the invention may be ferrous chloride in a spent hydrochloric acid pickling solution for steel strips in the steel making industry, ferrous chloride obtained by reducing a solution of ferric chloride with metallic iron such as iron scraps, or ferrous chloride obtained by dissolving metallic iron such as iron scraps in hydrochloric acid. Then magnetite magnetic powder can be produced at a very low cost.

The thus obtained magnetite magnetic powder has a specific surface area of 0.1 to 1.2 $m^2/g$ (corresponding to a volume average particle size of 0.8 to 10 μm), preferably at least 0.8 $m^2/g$ for use in a magnetic toner. Further, the magnetite magnetic powder contains up to 600 ppm of residual chlorine, with lower contents of residual chlorine being more desirable. This is because higher contents of residual chlorine in magnetite magnetic powder can damage the photoconductor drum of an electrophotographic device when an electrophotographic toner is prepared using the magnetite magnetic powder.

A method for preparing a magnetite magnetic powder according to a second aspect of the present invention is by using ferrous chloride as a starting material; pre-treating the material by heat treating it at a low temperature in a non-oxidizing atmosphere, cooling it down to a predetermined temperature, and then exposing it to an oxygen-containing atmosphere; and thereafter roasting the pre-treated material in a steam-containing atmosphere for pyrolysis thereof, thereby forming a magnetite magnetic powder. Like the magnetite magnetic powder obtained by the preparation method of the first aspect, the resulting magnetite magnetic powder has a saturation magnetization σs of 82 to 92 emu/g and a magnetite phase content of at least 90% by weight, possessing satisfactory magnetic properties. The magnetite magnetic powder obtained by the preparation method of the second aspect can have a larger specific surface area of 0.8 to 3.0 m²/g (corresponding to a volume average particle size of 1.5 to 0.3 μm) than the magnetite magnetic powder obtained by the preparation method of the first aspect.

Preferably the low-temperature heat treatment in the pre-treating step is carried out in a non-oxidizing atmosphere at a temperature in the range of 250° to 400° C. The non-oxidizing atmosphere used may be an inert gas such as nitrogen gas and argon gas or a gas mixture thereof with steam. Steam is optional. In this low-temperature heat treatment of ferrous chloride tetrahydrate, water of crystallization is released mainly from FeCl₂. If the low-temperature heat treatment is carried out in an oxidizing atmosphere, oxidation of ferrous chloride proceeds so that a hematite phase is produced in quantity. Below the above-defined temperature range, water of crystallization would not be completely eliminated and the effect of pre-treatment would be lost. It is to be noted that if the temperature is too high, a magnetite phase is produced, but grain growth would occur to inhibit the production of magnetite magnetic powder having a large specific surface area as defined above.

Note that the heating rate of the low-temperature heat treatment in the pre-treating step is preferably in the range of 5° to 60° C./min. though not limited thereto.

The ferrous chloride having subjected to the low-temperature heat treatment in the pre-treating step is cooled down to or below a predetermined temperature. The cooled ferrous chloride is exposed to an oxygen-containing atmosphere. Then ferrous chloride is oxidized at its surface whereby FeClO is formed on the surface to restrain further grain growth, allowing subsequent roasting to produce magnetite magnetic powder having a large specific surface area. The predetermined temperature on cooling is preferably 200° C. or lower, especially 150° C. or lower. The lower limit is not critical, but is generally room temperature. If ferrous chloride at a temperature in excess of 200° C. is exposed to an oxygen-containing atmosphere, hematite and other undesired products would form. The step of exposing ferrous chloride to an oxygen-containing atmosphere may be carried out immediately after the predetermined temperature is reached or later. The oxygen-containing atmosphere preferably has an oxygen partial pressure of at least 0.1 kPa, with the upper limit of oxygen partial pressure being substantially 0.1 MPa. Ferrous chloride is exposed to an oxygen-containing atmosphere, for example, by allowing the cooled material to stand in air or by introducing air into the furnace.

The material which has been subject to the pretreatment step in this way is then shifted to a roasting step. In the roasting step, ferrous chloride is roasted in an atmosphere where steam is present, with pyrolysis taking place to produce a magnetite magnetic powder. The roasting treatment is preferably carried out in an atmosphere consisting of a non-oxidizing gas and steam at a temperature in the range of 500° to 1,000° C. With regard to steam, it is desirable to set the inlet steam pressure as defined previously as high as possible within the range of 200 to 760 mmHg. The non-oxidizing gas used may be an inert gas such as nitrogen gas and argon gas as in the previous embodiment.

When roasting is effected within the above-defined temperature range, a magnetite magnetic powder having preferred magnetic properties as mentioned above is obtained. Outside the above-defined temperature range, wustite and hematite phases other than magnetite increase, failing to achieve a magnetite content within the preferred range.

Figure 3:
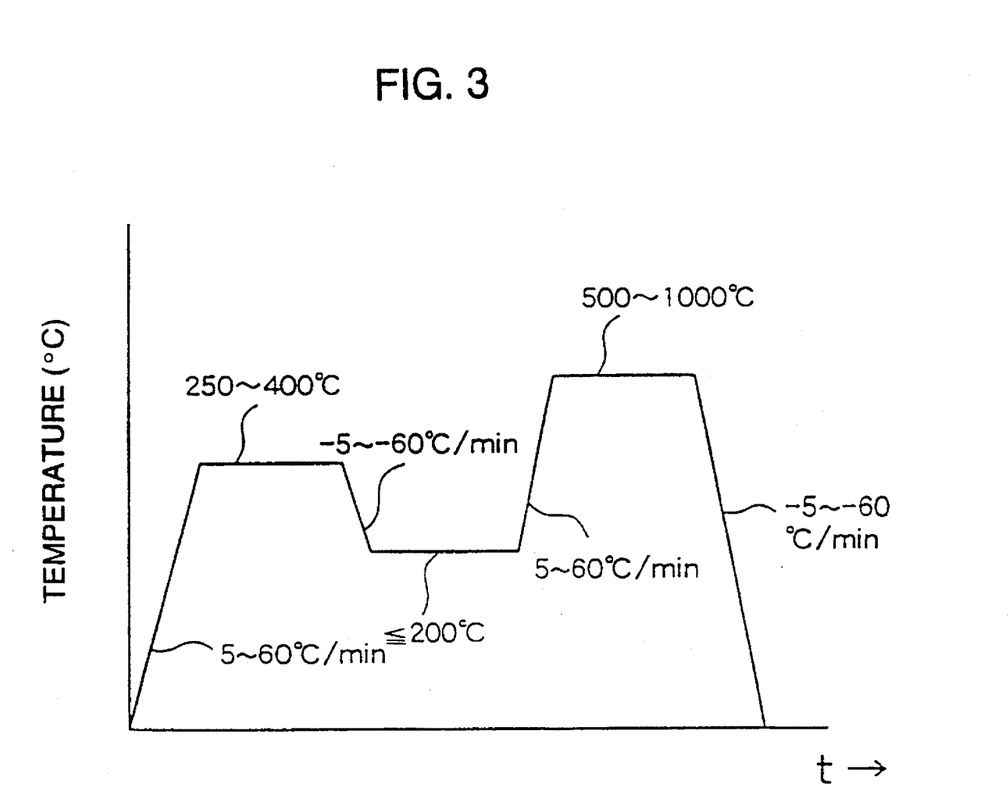
FIG. 3 is a graph showing two-stage roasting conditions in a preparation method according to the second aspect of the invention.

The preparation method mentioned above is illustrated in the time chart of FIG. 3.

The magnetite magnetic powder obtained through the above-mentioned pre-treatment should desirably have a specific surface area in the range of 0.8 to 3.0 m²/g as mentioned previously. While magnetic toners are reduced in particle size in the recent years, those particles having a specific surface area below the range cannot produce such ultrafine toners. Those particles having a specific surface area above the range are poorly dispersible because of a too small particle size.

The magnetite magnetic powder obtained by the preparation method according to the second aspect preferably has a saturation magnetization σs of 82 to 92 emu/g and a coercivity of 60 to 160 Oe in an applied magnetic field of 5,000 Oe. Further, the magnetite magnetic powder preferably contains up to 600 ppm of residual chlorine as in the previous embodiment, with lower contents of residual chlorine being more desirable.

A method for preparing a magnetite magnetic powder according to a third aspect of the present invention is by using a mixture of ferrous chloride and ferric chloride as a starting material, and roasting the material in a steam-existing atmosphere for effecting pyrolysis reaction to form a magnetite magnetic powder. Namely, a mixture of ferrous chloride and ferric chloride can be used as a starting material. The compositional ratio of ferrous chloride to ferric chloride desirably ranges from 25:75 to 75:25 in molar ratio. If more ferrous chloride is contained outside the range, the resulting magnetite would have a larger particle size and a lower static resistance value. Inversely, if more ferric chloride is contained, a hematite phase would be produced in more quantity to deteriorate magnetic properties.

As in the first and second aspects, the ferrous chloride used herein may be ferrous chloride in a spent hydrochloric acid pickling solution for steel strips in the steel making industry or ferrous chloride obtained by dissolving metallic iron such as iron scraps in hydrochloric acid. On the other hand, the ferric chloride used herein may be ferric chloride obtained by oxidizing the foregoing ferrous chloride or ferric chloride in a spent hydrochloric acid pickling solution for steel strips in the steel making industry.

The mixed starting material of ferrous chloride and ferric chloride is furnished by mixing and agitating respective solutions to form a reagent solution mixture or by evaporating water from this reagent solution mixture to form a crystalline reagent mixture.

The mixed material is pyrolyzed by roasting. This roasting is carried out in an atmosphere where steam is present. Preferably this roasting is carried out in an atmosphere consisting of a non-oxidizing gas and steam at a temperature in the range of 430° to 800° C. The preparation method according to the third aspect permits the roasting temperature to be lower than in the first and second aspects. With regard to steam, it is desirable to set the inlet steam pressure as defined previously as high as possible within the range of 200 to 760 mmHg. The non-oxidizing gas used may be nitrogen gas and argon gas as in the previous embodiment.

When roasting is effected within the above-defined temperature range, a magnetite magnetic powder having preferred magnetic properties as mentioned above is obtained. Outside the above-defined temperature range, wustite and hematite phases other than magnetite increase, failing to achieve a magnetite content within the range of the third aspect.

The magnetite magnetic powder obtained by the preparation method according to the third aspect preferably has a saturation magnetization σs of 82 to 92 emu/g and a coercivity of 60 to 160 Oe in an applied magnetic field of 5,000 Oe as in the first and second aspects. Also its resistance under an applied voltage of 100 V is preferably at least $10^6$ $\Omega$, especially $10^6$ to $10^{10}$ $\Omega$. Further, the magnetite magnetic powder preferably contains up to 600 ppm of residual chlorine as in the first and second aspects, with lower contents of residual chlorine being more desirable.

The preparation methods according to the three aspects are preferably practiced by a rotary kiln technique, an atomizing roaster technique, a fluidized bed roaster technique or a tunnel kiln technique.

The rotary kiln technique uses a kiln in the form of a large iron cylinder lined with refractory brick resting at an angle on a rotating means. The iron cylinder is heated at the lower end and charged with a raw material from the upper end. As the cylinder rotates, the raw material migrates toward the lower end of the maximum temperature whereby the raw material is fired or roasted.

Figure 4:
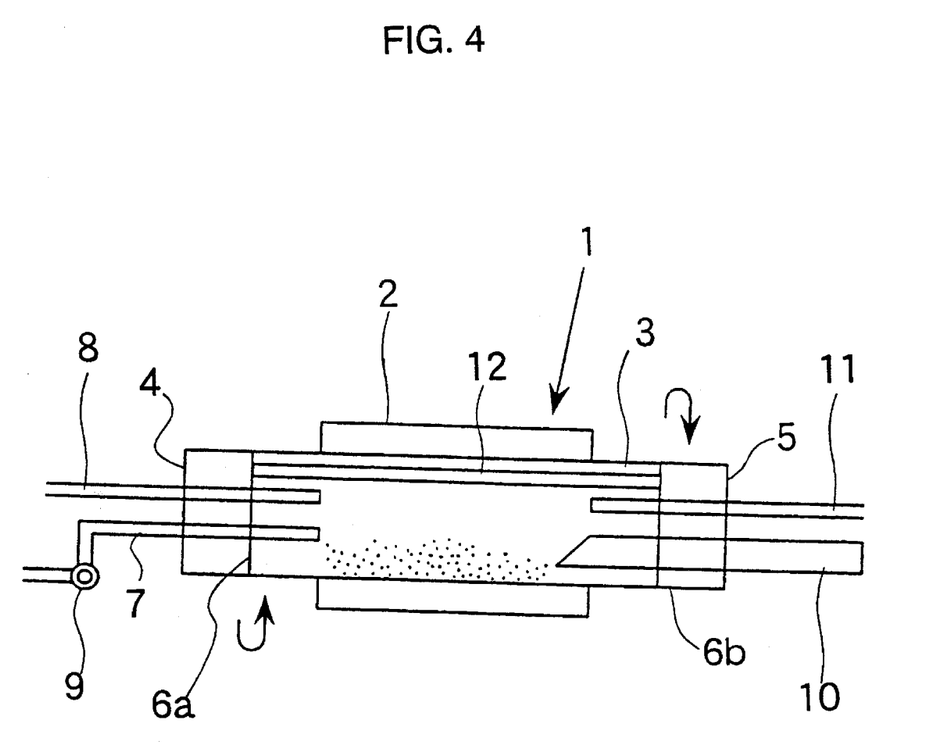
FIG. 4 is a longitudinal cross-sectional view of a rotary kiln used in a method of producing magnetite according to the invention.
Figure 5:
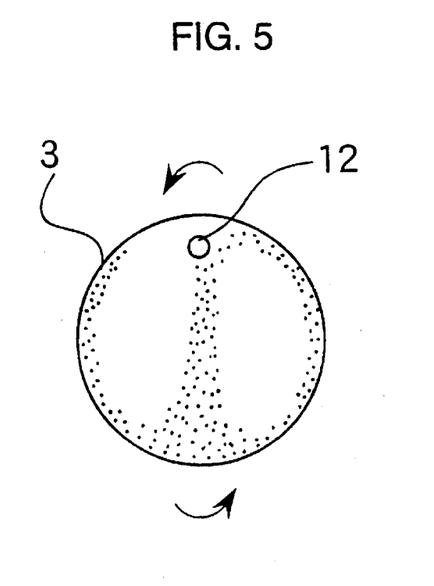
FIG. 5 is a transverse cross-sectional view of the rotary kiln.

One exemplary rotary kiln used herein is one of the structure shown in FIGS. 4 and 5. Use of this rotary kiln is desirable particularly when the raw material is liquid. Therefore, use of this rotary kiln is preferable particularly when the raw material is liquid in the preparation method according to the third aspect.

In the figures, numeral 1 designates a rotary kiln which includes a rotary furnace main body 2. The rotary furnace main body 2 has a cylindrical core tube 3 where a raw material is admitted into the core tube 3 from one end 4 and subject to heat treatment. Magnetite produced therein is removed from another end 5. The furnace core tube 3 is tilted at an angle of 10 to 30 degrees relative to the horizon with the one end 4 where the raw material is admitted being located above and the other end 5 where magnetite is removed being located below. Therefore, this rotary kiln 1 has a fluidizing angle in the range of 10 to 30 degrees. It is also desirable to set the revolution of the furnace core tube 3 in the range of 3 to 30 rpm.

The furnace core tube 3 at the one and other ends is equipped with plugs 6a and 6b for sealing the furnace core tube interior. The plug 6a at the one end 4 is provided with a raw material inlet pipe 7 for admitting a raw material into the furnace core tube 3 and a HCl recovery pipe 8 for recovering HCl released upon magnetite formation. A metering pump 9 is disposed midway the raw material inlet pipe 7 for pumping a certain quantity of a liquid raw material into the furnace core tube 3.

The plug 6b at the other end 5 is provided with a magnetite recovery pipe 10 for taking the magnetite produced within the furnace out of the furnace and a gas admitting pipe 11 for introducing a surrounding gas into the furnace. Disposed within the furnace core tube 3 is a stripping bar 12 of glass which is fixedly secured so as not to move with the furnace core tube 3 as best shown in FIG. 2. Since magnetite produced in the furnace core tube 3 deposits on the inner wall thereof, the stripping bar 12 is spaced a distance of 3 to 30 mm from the inner wall of the furnace core tube 3 for scraping off the magnetite deposits from the inner wall.

The atomizing roaster technique is a technique involving adjusting the concentration of iron chloride or the like in an aqueous solution, atomizing the adjusted chloride aqueous solution into a roasting furnace from its top, effecting atomization and roasting such that atomized droplets may flow counter to the high-temperature heating medium gas, and taking out of the furnace bottom an oxide powder resulting from this roasting reaction.

The fluidized bed roaster technique is a technique involving adjusting the concentration of iron chloride or the like in an aqueous solution, atomizing the adjusted chloride aqueous solution into a fluidization roasting furnace having a fluidized bed held at a certain temperature, effecting atomization and roasting such that atomized droplets may flow in the same direction as the high-temperature heating medium gas, and taking the oxide powder out of the furnace top an oxide powder resulting from this roasting reaction.

The tunnel kiln is a tunnel-shaped kiln for continuously firing or roasting ceramic articles or the like. The tunnel kiln technique is a technique wherein a carriage having rested thereon articles to be fired is moved at a constant speed through the kiln which is set such that the temperature increases from the inlet to a pre-heating chamber and then to a heating chamber and decreases to a cooling chamber and then to the outlet whereby the articles are fired or roasted at predetermined heating and cooling rates.

Steam is introduced into each of the above-mentioned furnaces desirably by using a non-oxidizing gas forming a part of the atmosphere as a carrier gas. The non-oxidizing gas used herein may be argon gas or the like as well as the afore-mentioned nitrogen gas.

Reaction takes place instantaneously in the atomizing roaster and fluidized bed roaster techniques while the temperature holding time of the above-mentioned heat treatment is desirably a passage time of up to 2 hours when reaction is effected in the rotary kiln and desirably a passage time of up to 10 hours when reaction is effected in the tunnel kiln. When roasting is effected in the rotary kiln or tunnel kiln, the passage time is desirably set to at least about 10 minutes.

Further, the heating and cooling rates are not critical though they are preferably about 5° to 60° C./min.

The magnetite magnetic powder obtained in the above-mentioned way is especially suitable as a magnetic toner. The magnetic toner contains the magnetite powder and a binder resin as main components. Preferably the magnetite powder is contained in an amount of about 5 to 70% by weight of the entire toner. If the magnetite powder is less than 5% by weight, the magnetic toner becomes lower in magnetization, leading to image deterioration (a loss of resolution, an increase of fogging B. G). If the magnetite powder is more than 70% by weight, the magnetic toner loses charging ability, incurring a loss of ID.

The resin used herein includes styrene-acryl resins, polyester resins, and epoxy resins.

Preferably the magnetic toner further contains a charge control agent and other additives. The charge control agent is optionally added in order to control charging polarity, charging quantity and the like. Any suitable charge control agent may be selected from well-known ones in accordance with the desired polarity, charging quantity and the like, with no particular limit being imposed. Exemplary charge control agents are metal complex azo dyes and Nigrosine dyes while they may be selected in accordance with the desired properties. The content of the charge control agent is preferably about 0.1 to 5 parts by weight per 100 parts by weight of the resin in toner particles. Also 0.1 to 5.0 parts by weight of carbon black may be added as a color adjusting pigment.

Other additives which can be used herein include wax, olefins such as polyethylene and polypropylene, and silicone oil.

Wax is optionally added as a mold release agent for preventing offset. The wax used herein is not critical and any of various well-known waxes, for example, polyethylene wax, polypropylene wax and silicon wax may be used while they may be selected in accordance with the desired properties. The content of the wax is preferably about 1 to 7 parts by weight per 100 parts by weight of the resin in toner particles.

Particles of the magnetic toner may preferably have a mean particle diameter of from 3 to 25 μm, more preferably from 3 to 20 μm, most preferably 4 to 12 μm. If the mean particle diameter is too larger, the developer would deteriorate in flow and tends to incur caking and sleeve adhesion. If the mean particle diameter is too smaller, resolution would deteriorate and fixation would be short. The mean particle diameter of toner particles is a 50% mean particle diameter obtained by calculation of the volume particle diameter from measurements by the Coulter counter method. The Coulter counter method carries out measurement on a volume basis using a Coulter counter Model TA-II having an aperture diameter of 100 μm (manufactured by Coulter Electronics) and Isoton II (manufactured by Coulter Electronics) as the electrolytic solution. As to the particle diameter distribution, it is preferred that the proportion of particles having a diameter of at least 2 d is up to about 5% and the proportion of particles having a diameter of up to d/2 is up to about 5% provided that d is a mean particle diameter.

Further preferably, the magnetic toner particles have a coercivity Hc of 35 to 230 Oe, especially 40 to 140 Oe under an applied magnetic field of 5,000 Oe, for example, and a saturation magnetization σs of 8 to 65 emu/g, especially 15 to 40 emu/g under an applied magnetic field of 5,000 Oe, for example.

Source toner particles as mentioned above may be prepared by a conventional toner preparation technique. It is noted that the toner particles may further contain a resistance modifier or the like.

The magnetite magnetic powder obtained by the present invention may also be used in magnetic ink as well as the magnetic toner.

EXAMPLE

Examples of the present invention are given below by way of illustration.

Example 1

Ferrous chloride tetrahydrate, 2 g, was loaded in a small size, lateral tubular furnace through which an atmosphere containing nitrogen as a carrier gas and having a steam pressure as shown in Table 2 was introduced and passed. In this condition, the sample was heated at 10° C./min. and held at a temperature as shown in Table 2 for a time as shown in Table 2, whereby the ferrous chloride was roasted, obtaining sample Nos. 1 to 25. The resulting sample Nos. 1 to 25 were examined for crystal type, magnetite phase content (wt. %), σs (emu/g), Hc (Oe), and R (Ω).

TABLE 2

| No. | Roasting conditions | | Atmosphere | Major phase | $Fe_3O_4$ (wt %) | σs (emu/g) | Hc (Oe) | R (Ω) |
| | Temp. (°C.) | Holding time | $N_2$-steam (mmHg) | | | | | |
|---|---|---|---|---|---|---|---|---|
| 1 | 500 | 10 min | 760 | M, W | 92 | 84.3 | 180 | $4 \times 10^6$ |
| 2 | 530 | 10 min | 750 | M, W | 98 | 89.1 | 145 | $3 \times 10^6$ |
| 3 | 1000 | 10 min | 760 | M, H | 91 | 82.1 | 120 | $6 \times 10^6$ |
| 4* | 1050 | 10 min | 760 | M, H | 85 | 76.3 | 110 | $7 \times 10^6$ |
| 5* | 480 | 10 min | 400 | M, W | 87 | 78.1 | 170 | $8 \times 10^6$ |
| 6 | 500 | 10 min | 400 | M, W | 91 | 84.3 | 160 | $5 \times 10^6$ |
| 7 | 800 | 10 min | 400 | M, H | 92 | 83.3 | 120 | $4 \times 10^6$ |
| 8* | 850 | 10 min | 400 | M, H | 88 | 80.1 | 115 | $6 \times 10^6$ |
| 9* | 500 | 10 min | 200 | M, H, W | 67 | 61.5 | 130 | $9 \times 10^6$ |
| 10 | 530 | 10 min | 200 | M, H | 92 | 84.7 | 105 | $7 \times 10^6$ |
| 11 | 600 | 10 min | 200 | M, H | 95 | 88.8 | 110 | $5 \times 10^6$ |
| 12 | 750 | 10 min | 200 | H, M | 91 | 83.7 | 115 | $6 \times 10^6$ |
| 13* | 800 | 10 min | 200 | H, M | 89 | 81.9 | 117 | $7 \times 10^6$ |
| 14* | 530 | 10 min | 100 | M, H, W | 85 | 76.3 | 120 | $5 \times 10^6$ |
| 15* | 600 | 10 min | 100 | M, H | 87 | 78.1 | 102 | $6 \times 10^6$ |
| 16* | 700 | 10 min | 100 | M, H | 89 | 81.8 | 101 | $5 \times 10^6$ |
| 17 | 550 | 10 min | 760 | M | 100 | 90.5 | 110 | $5 \times 10^6$ |
| 18 | 550 | 2 h | 760 | M | 100 | 91.5 | 110 | $6 \times 10^6$ |
| 19 | 700 | 10 sec | 760 | M | 100 | 92.0 | 120 | $4 \times 10^6$ |
| 20 | 700 | 10 min | 760 | M | 100 | 92.1 | 120 | $8 \times 10^6$ |
| 21 | 700 | 2 h | 760 | M | 100 | 92.3 | 119 | $6 \times 10^6$ |
| 22 | 800 | 10 min | 760 | M | 100 | 91.9 | 131 | $7 \times 10^6$ |
| 23 | 550 | 10 min | 600 | M | 100 | 92.0 | 129 | $6 \times 10^6$ |
| 24 | 600 | 10 min | 600 | M | 100 | 91.7 | 121 | $5 \times 10^6$ |
| 25 | 650 | 10 min | 700 | M | 100 | 91.8 | 119 | $6 \times 10^6$ |

*outside the preferred range
M: $Fe_3O_4$  H: $\alpha$-$Fe_2O_3$  W: FeO

The measurements were done as follows.

The type of crystal was identified by qualitative analysis based on powder X-ray diffractometry. The magnetite phase content was determined from a relationship of the magnetite phase content to an X-ray relative intensity ratio of respective crystal phases. σs (emu/g) and Hc (Oe) were measured under an applied magnetic field of 5,000 Oe by means of a vibrating sample magnetometer. R (Ω) was determined by setting 0.3 g of a sample in a resistance measuring jig, applying 10 V thereacross, and measuring the static resistance by means of a resistance meter.

As is evident from Table 2, sample Nos. 1, 2, 3, 6, 7, 10, 11, 12, 17, 18, 19, 20, 21, 22, 23, 24, and 25 which were roasted under conditions within the scope of the invention had a magnetite phase content of more than 90%. Particularly when the steam pressure was 600 to 760 mmHg and the treating temperature was 550° to 800° C., magnetic powders solely of a magnetite phase were obtained. All these samples had a σs within the range of 82 to 92 emu/g.

In contrast, sample Nos. 4, 5, 8, 9, 13, 14, 15, and 16 which were roasted under conditions outside the scope of the invention had a magnetite phase content of less than 90%. Also these samples, Nos. 4, 5, 8, 9, 13, 14, 15, and 16, had a σs of less than 82 emu/g.

Selecting sample No. 17 of 100 wt. % magnetite, sample No. 6 of 91 wt. % magnetite, and sample No. 4 of 85 wt. % magnetite, the respective magnetic powder samples were measured for the function as a pigment. This measurement was done by setting 0.3 g of magnetic powder on double side adhesive tape, attaching the tape to a sheet of copy paper, and measuring the density of magnetic powder in this condition by means of a Macbeth densitometer. Sample Nos. 17, 6 and 4 had a density of 1.65, 1.58 and 1.52, respectively. It is seen that as the magnetite phase increases in quantity, the density increases and hence, the function as a pigment improves.

Figure 6:
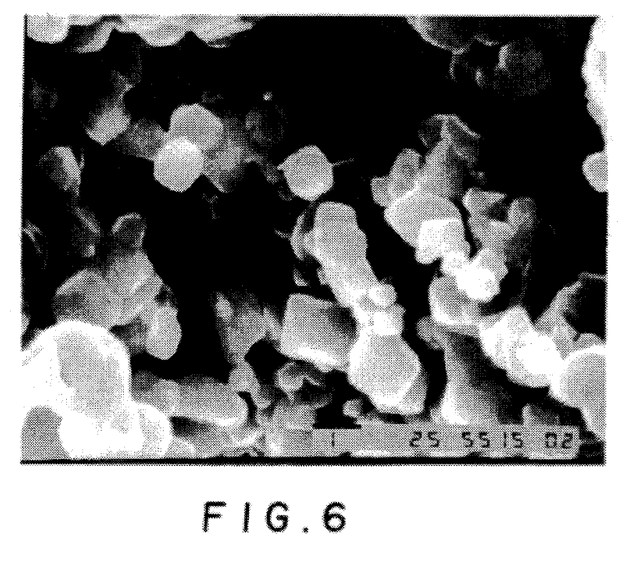
FIG. 6 is a SEM photograph of inventive sample No. 17.
Figure 7:
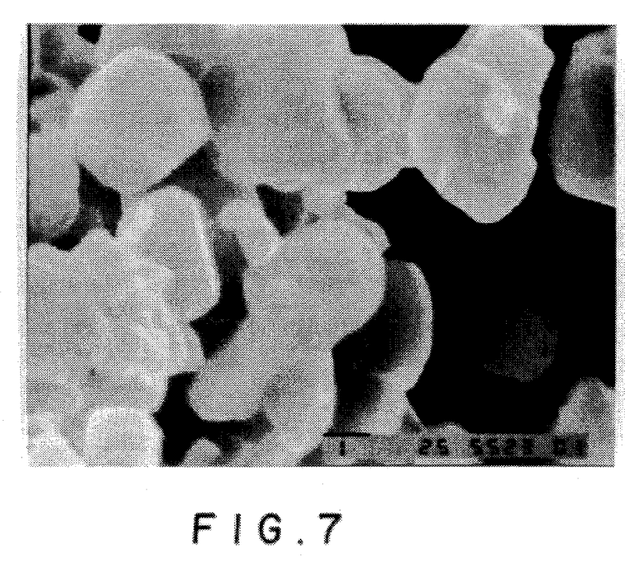
FIG. 7 is a SEM photograph of inventive sample No. 18.
Figure 8:
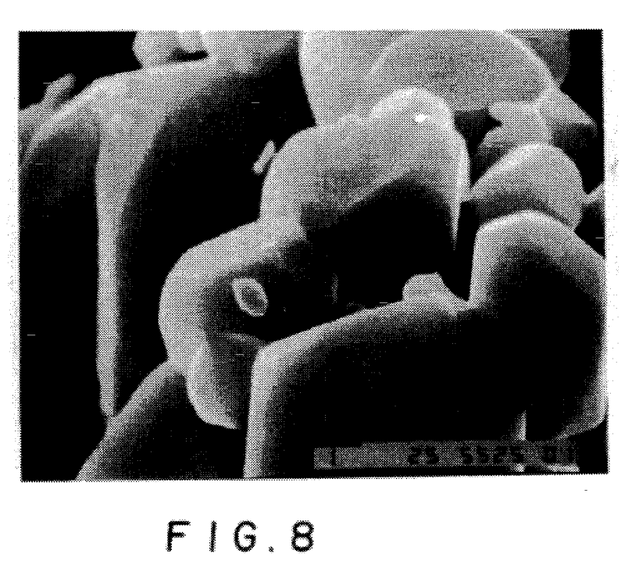
FIG. 8 is a SEM photograph of a sample obtained by changing the heat treating time of sample No. 18 to 5 hours.

Shown in FIGS. 6 and 7 are SEM photographs of sample Nos. 17 and 18. FIG. 8 shows a SEM photograph of a sample which was prepared as in sample No. 18 by extending the roasting time to 5 hours. A magnetic powder solely of a magnetite phase was obtained even when the roasting time was extended to 5 hours although it was observed that grains grew as the treating time became longer.

Also sample Nos. 2, 3, 7 and 11 were measured for residual chlorine by quantitative analysis based on X-ray fluorometry, finding a residual chlorine content of 230, 50, 400, and 550 ppm, respectively, that is, within the range of 50 to 550 ppm. This content is extremely low as compared with the magnetite magnetic powders obtained by conventional wet and solid phase processes having a content of non-decomposed impurities ($SO_4^{2-}$, $Cl^-$, etc.) of at least 600 ppm, usually 1,000 to 6,000 ppm.

Note that the measurement of a chlorine content by X-ray fluorometry was carried out by irradiating X-ray to the surface of a sample compacted by a press method, determining a peak value of Cl, and effecting quantification of a Cl content. Peak values of Cl were previously calibrated by furnishing samples having varying Cl contents, and the Cl content was determined by plotting a peak value on the calibration curve.

Example 2

A magnetite magnetic powder was prepared by the same procedure as sample No. 17 except that a waste hydrochloric acid solution used for pickling of steel strips in the steel making industry was dried under a nitrogen atmosphere at 100° C. to form ferrous chloride and 2 g of this ferrous chloride was used as the starting material. Like sample No. 17, it was a magnetic powder solely of a magnetite phase.

For comparison purposes, a magnetite magnetic powder was prepared as above except that the steam pressure of the atmosphere was 32 mmHg. The powder contained magnetite as a major phase, but a hematite phase occupied more than 25% by weight.

Additionally, similar results were obtained when a ferrous chloride solution obtained by reducing a solution of ferric chloride with metallic iron such as iron scraps and ferrous chloride obtained by dissolving metallic iron such as iron scraps in hydrochloric acid were used as the starting material.

Furthermore, similar magnetite magnetic powders were obtained when the roasting step was carried out by an atomizing roaster technique, a fluidized bed roaster technique, a rotary kiln technique, and a tunnel kiln technique instead of the above-mentioned technique using a small size, lateral tubular furnace.

Next, the magnetic powders of sample Nos. 17 and 6 in Example 1 and the magnetic powder of sample No. 4 for comparison sake were formulated into a toner under the following conditions, obtaining toner Nos. 1, 2, and 3, respectively.

Ingredients were weighed so as to give a composition of 63.5% of St/Ac (binder resin), 35% of magnetic powder, 1% of TRH charge control agent, and 0.5% of $SiO_2$ (additive). They were melt kneaded in a pressure kneader, comminuted and classified, obtaining a magnetic toner having a volume average particle diameter of 7 μm (particle diameter measured by means of a Coulter counter). These toner powders were measured for some properties, with the results shown in Table 3.

TABLE 3

| Properties | Unit | Toner 1 magnetite 100 wt % | Toner 2 magnetite 91 wt % | Toner 3 (comparison) magnetite 85 wt % |
|---|---|---|---|---|
| Apparent density | g/cm³ | 0.521 | 0.510 | 0.512 |
| Flow (on 100#) | gr | 0.075 | 0.081 | 0.076 |
| Saturation magnetization (5k Oe) | emu/g | 29.6 | 27.1 | 23.1 |
| Coercivity (5k Oe) | Oe | 121 | 109 | 145 |
| Volume average particle diameter | μm | 7.05 | 7.28 | 7.20 |
| Charging quantity (10 sec.) | μc/g | −41.6 | −39.7 | −33.7 |
| Tg | °C. | 60.4 | 60.0 | 60.4 |
| Storage | — | good | good | good |

A commercially available electrophotographic printer (manufactured by Canon K. K.) was loaded with the above magnetic toner Nos. 1, 2 and 3 to determine performance parameters. The results are shown in Table 4.

TABLE 4

| Properties | Unit | Toner 1 magnetite 100 wt % | Toner 2 magnetite 91 wt % | Toner 3 (comparison) magnetite 85 wt % |
|---|---|---|---|---|
| Initial properties | | | | |
| Image density | — | 1.47 | 1.49 | 1.43 |
| Fogging | % | 0.2 | 0.6 | 2.3 |
| Character scattering | — | good | somewhat poor | somewhat poor |
| Fixation | % | 98.5 | 98.0 | 92.1 |
| Offsetting | — | good | good | good |

As seen from Table 4, toner Nos. 1 and 2 within the scope of the present invention had satisfactory toner properties, but comparative toner No. 3 showed undesirable results with respect to fogging and the like.

Example 3

Ferrous chloride tetrahydrate, 2 g, was loaded in a small size, lateral tubular furnace through which an atmosphere containing nitrogen as a carrier gas and having a steam pressure of 760 mmHg was continuously introduced and passed. In this condition, the sample was heated at 10° C./min. and held at a temperature as shown in Tables 5-1 to 5-3 for a time as shown in the Tables to achieve low-temperature heat treatment as a pre-treatment, then cooled to a temperature as shown in the Tables, and thereafter allowed to stand in air. The thus treated sample was loaded again in a small size, lateral tubular furnace through which an atmosphere containing nitrogen as a carrier gas and having a steam pressure of 760 mmHg was continuously introduced and passed. In this condition, the sample was heated at 10° C./min. and held at a temperature as shown in Tables 5-1 to 5-3 for a time as shown in the Tables to achieve roasting, obtaining sample Nos. 31 to 45. The resulting sample Nos. 31 to 45 were examined for crystal type, magnetite phase content (wt. %), σs (emu/g), Hc (Oe), specific surface area ($m^2/g$), and chlorine content (ppm).

The specific surface area ($m^2/g$) was determined by charging a cell with 0.5 g of a sample and measuring according to a BET one point method. The remaining measurements were the same as above. The results are shown in Table 6.

TABLE 5-1

| | Heat treating procedure | Temp. | Heating rate | Holding time | Atmosphere |
|---|---|---|---|---|---|
| 31 | 2-stage roasting | | | | |
| | low-temp. heat treatment (1st) | 300° C. | 10° C./min | 10 min | $N_2$-steam (760 mmHg) |
| | cooling temp. | 110° C. | | | |
| | roasting (2nd) | 600° C. | 10° C./min | 10 min | $N_2$-steam (760 mmHg) |
| 32* | 2-stage roasting | | | | |
| | low-temp. heat treatment (1st) | 200° C.* | 10° C./min | 10 min | $N_2$-steam (760 mmHg) |
| | cooling temp. | 110° C. | | | |
| | roasting (2nd) | 600° C. | 10° C./min | 10 min | $N_2$-steam (760 mmHg) |
| 33* | 2-stage roasting | | | | |
| | low-temp. heat treatment (1st) | 450° C.* | 10° C./min | 10 min | $N_2$-steam (760 mmHg) |
| | cooling temp. | 100° C. | | | |
| | roasting (2nd) | 700° C. | 10° C./min | 10 min | $N_2$-steam (760 mmHg) |
| 34 | 2-stage roasting | | | | |
| | low-temp. heat treatment (1st) | 400° C. | 10° C./min | 10 min | $N_2$-steam (760 mmHg) |
| | cooling temp. | 130° C. | | | |
| | roasting (2nd) | 800° C. | 10° C./min | 10 min | $N_2$-steam (760 mmHg) |
| 35 | 2-stage roasting | | | | |
| | low-temp. heat treatment (1st) | 300° C. | 10° C./min | 10 min | $N_2$-steam (760 mmHg) |
| | cooling temp. | 130° C. | | | |
| | roasting (2nd) | 800° C. | 10° C./min | 10 min | $N_2$-steam (760 mmHg) |
| 36* | 2-stage roasting | | | | |
| | low-temp. heat treatment (1st) | 250° C. | 10° C./min | 10 min | $N_2$-steam (760 mmHg) |
| | cooling temp. | 150° C. | | | |
| | roasting (2nd) | 1050° C.* | 10° C./min | 10 min | $N_2$-steam (760 mmHg) |

*outside the preferred range

TABLE 5-2

| | Heat treating procedure | Temp. | Heating rate | Holding time | Atmosphere |
|---|---|---|---|---|---|
| 37 | 2-stage roasting | | | | |
| | low-temp. heat treatment (1st) | 400° C. | 10° C./min | 10 min | $N_2$-steam (760 mmHg) |
| | cooling temp. | 110° C. | | | |
| | roasting (2nd) | 550° C. | 10° C./min | 10 min | $N_2$-steam (760 mmHg) |
| 38 | 2-stage roasting | | | | |
| | low-temp. heat treatment (1st) | 250° C. | 10° C./min | 10 min | $N_2$-steam (760 mmHg) |
| | cooling temp. | 140° C. | | | |
| | roasting (2nd) | 650° C. | 10° C./min | 10 min | $N_2$-steam (760 mmHg) |
| 39 | 2-stage roasting | | | | |
| | low-temp. heat treatment (1st) | 350° C. | 10° C./min | 10 min | $N_2$-steam (760 mmHg) |
| | cooling temp. | 100° C. | | | |
| | roasting (2nd) | 1000° C. | 10° C./min | 10 min | $N_2$-steam (760 mmHg) |
| 40 | 2-stage roasting | | | | |
| | low-temp. heat treatment (1st) | 350° C. | 10° C./min | | $N_2$-steam (760 mmHg) |
| | cooling temp. | 100° C. | | | |
| | roasting (2nd) | 800° C. | 10° C./min | | $N_2$-steam (760 mmHg) |
| 41** | 1-stage roasting | | | | |
| | roasting | 800° C. | 10° C./min | 10 min | $N_2$-steam (760 mmHg) |

*outside the preferred range
**comparison

TABLE 5-3

| | Heat treating procedure | Temp. | Heating rate | Holding time | Atmosphere |
|---|---|---|---|---|---|
| 42* | 2-stage roasting | | | | |
| | low-temp. heat treatment (1st) | 350° C. | 10° C./min | 10 min | $N_2$-steam (760 mmHg) |
| | cooling temp. | 110° C. | | | |
| | roasting (2nd) | 1100° C.* | 10° C./min | 10 min | $N_2$-steam (760 mmHg) |
| 43* | 2-stage roasting | | | | |
| | low-temp. heat treatment (1st) | 300° C. | 10° C./min | 10 min | $N_2$-steam (760 mmHg) |
| | cooling temp. | 130° C. | | | |
| | roasting (2nd) | 450° C. | 10° C./min | 10 min | $N_2$-steam (760 mmHg) |
| 44 | 2-stage roasting | | | | |
| | low-temp. heat treatment (1st) | 300° C. | 10° C./min | 10 min | $N_2$-steam (760 mmHg) |
| | cooling temp. | 130° C. | | | |
| | roasting (2nd) | 550° C. | 10° C./min | 10 min | $N_2$-steam (760 mmHg) |
| 45 | 2-stage roasting | | | | |
| | low-temp. heat treatment (1st) | 300° C. | 10° C./min | 10 min | $N_2$-steam (760 mmHg) |
| | cooling temp. | 130° C. | | | |
| | roasting (2nd) | 900° C. | 10° C./min | 10 min | $N_2$-steam (760 mmHg) |

*outside the preferred range

TABLE 6

| | X-ray diffraction | Specific surface area ($m^2/g$) | Saturation magnetization (emu/g) | Coercivity (Oe) | Magnetite phase wt (%) | Chlorine content (ppm) |
|---|---|---|---|---|---|---|
| 31 | $Fe_3O_4$ | 2.3 | 86.9 | 125 | 100 | 435 |
| *32 | $Fe_3O_4$, FeO | 0.6* | 64.8** | 176 | 91 | 733* |
| *33 | $Fe_3O_4$ | 0.7* | 90.3 | 58* | 100 | 208 |
| 34 | $Fe_3O_4$ | 1.3 | 86.6 | 81 | 100 | 106 |
| 35 | $Fe_3O_4$ | 2.1 | 88.8 | 97 | 100 | 137 |
| *36 | $Fe_3O_4$, $\alpha$-$Fe_2O_3$ | 3.2* | 75.0 | 108 | 85** | 84 |
| 37 | $Fe_3O_4$ | 1.8 | 90.9 | 95 | 100 | 475 |
| 38 | $Fe_3O_4$ | 1.2 | 85.8 | 138 | 100 | 403 |
| 39 | $Fe_3O_4$ | 2.7 | 83.7 | 154 | 100 | 87 |
| 40 | $Fe_3O_4$ | 1.5 | 87.5 | 73 | 100 | 125 |
| *41 | $Fe_3O_4$ | 0.5* | 89.3 | 58* | 100 | 195 |
| *42 | $Fe_3O_4$, $\alpha$-$Fe_3O_4$ | 3.4* | 74.2** | 201 | 80** | 110 |
| *43 | $Fe_3O_4$, FeO | 0.9* | 63.8** | 178 | 71** | 624* |
| 44 | $Fe_3O_4$ | 1.5 | 87.8 | 115 | 100 | 459 |
| 45 | $Fe_3O_4$ | 2.6 | 89.3 | 87 | 100 | 103 |

*outside the preferred range
**comparison

As is evident from Table 6, the samples in which the heat treating procedure was effected under conditions within the scope of the invention had a specific surface area in the preferred range of 0.8 to 3.0 $m^2/g$ and a magnetite phase content of more than 90 wt. %. Particularly when the steam pressure was 760 mmHg and the roasting temperature was 500° to 1,000° C., magnetic powders solely of a magnetite phase were obtained. All the samples within the scope of the invention had a saturation magnetization σs within the preferred range of 82 to 92 emu/g, a coercivity Hc within the preferred range of 60 to 160 Oe, and a chlorine content within the preferred range of up to 600 ppm.

In contrast, sample Nos. 32, 33, 36, 41, 42, and 43 in which the heat treating procedure was effected under conditions outside the scope of the invention had at least one of the properties falling outside the scope of the invention.

Selecting sample No. 31 of 100 wt. % magnetite, sample No. 32 of 91 wt. % magnetite, and sample No. 42 of 80 wt. % magnetite, the respective magnetic powder samples were measured for density by means of a Macbeth densitometer as described above. Sample Nos. 31, 32 and 41 had a density of 2.05, 1.93 and 1.73, respectively. It is seen that as the magnetite phase increases in quantity, the density increases and hence, the function as a pigment improves.

Figure 9:
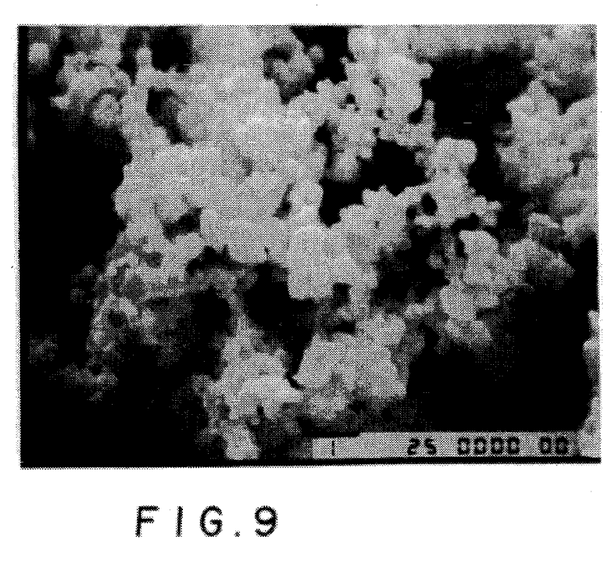
FIG. 9 is a SEM photograph of inventive sample No. 35.
Figure 10:
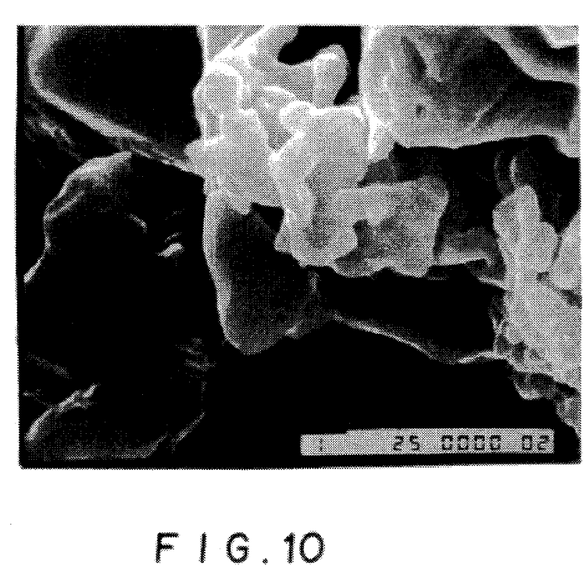
FIG. 10 is a SEM photograph of comparative sample No. 41.

Shown in FIGS. 9 and 10 are SEM photographs of inventive sample No. 35 and comparative sample No. 41. It is seen that the sample subject to two-stage roasting according to the present invention had a very small particle diameter.

Example 4

A magnetite magnetic powder of Example 4 was prepared by the same procedure as sample No. 31 except that a waste hydrochloric acid solution used for pickling of steel strips in the steel making industry was dried under a nitrogen atmosphere at 100° C. to form ferrous chloride and 2 g of this ferrous chloride was used as the starting material. Like sample No. 31, it was a magnetic powder solely of a magnetite phase.

For comparison purposes, a magnetite magnetic powder was prepared as in Example 4 except that the conditions of sample No. 42 outside the scope of the invention were used. The powder contained magnetite as a major phase, but a hematite phase occupied more than 30% by weight.

Additionally, similar results were obtained when a ferrous chloride solution obtained by reducing a solution of ferric chloride with metallic iron such as iron scraps and ferrous chloride obtained by dissolving metallic iron such as iron scraps in hydrochloric acid were used as the starting material.

Furthermore, similar magnetite magnetic powders were obtained when the roasting step was carried out by an atomizing roaster technique, a fluidized bed roaster technique, a rotary kiln technique, and a tunnel kiln technique instead of the above-mentioned technique using a small size, lateral tubular furnace.

Next, the magnetic powder of sample No. 31 in Example 3 and the magnetic powder of sample No. 36 for comparison sake were formulated into a toner under the following conditions, obtaining toner Nos. 4 and 5, respectively.

Ingredients were weighed so as to give a composition of 63.5% of binder resin (St/Ac and PP), 35% of magnetic powder, 1% of charge control agent (TRH), and 0.5% of additive ($SiO_2$). They were melt kneaded in a pressure kneader, comminuted and classified, obtaining a magnetic toner having a volume average particle diameter of 7 μm. These toner powders were measured for some properties, with the results shown in Table 7. The volume average particle diameter was measured by a Coulter counter.

TABLE 7

| Properties | Unit | Toner 4 magnetite 100 wt % | Toner 5 (comparison) magnetite 85 wt % |
|---|---|---|---|
| Apparent density | g/cm$^3$ | 0.511 | 0.502 |
| Flow (on 100#) | gr | 0.078 | 0.089 |
| Saturation magnetization (5k Oe) | emu/g | 28.0 | 24.1 |
| Coercivity (5k Oe) | Oe | 95 | 110 |
| Volume average particle diameter | μm | 7.05 | 7.28 |
| Charging quantity (10 sec.) | μc/g | −43.6 | −36.7 |
| Tg | °C. | 60.4 | 60.9 |
| Storage | — | good | good |

A commercially available electrophotographic printer (manufactured by Canon K. K.) was loaded with the above magnetic toner Nos. 4 and 5 to determine performance parameters. The results are shown in Table 8.

TABLE 8

| Properties | Unit | Toner 4 magnetite 100 wt % | Toner 5 (comparison) magnetite 85 wt % |
|---|---|---|---|
| Initial properties | | | |
| Image density | — | 1.47 | 1.42 |
| Fogging | % | 0.2 | 2.0 |
| Character scattering | — | good | poor |
| Fixation | * | 98.3 | 91.1 |
| Offsetting | — | good | good |

As seen from Table 8, toner No. 4 within the scope of the present invention had satisfactory toner properties, but comparative toner No. 5 showed undesirable results with respect to fogging and the like.

Example 5

Ferrous chloride tetrahydrate and ferric chloride were mixed in a molar ratio as shown in Table 9 and dissolved in water. The mix solution was agitated while water was evaporated at 100° C. There were obtained crystal mixes for sample Nos. 51, 52, 53, 54, 58, and 59.

A 100-g portion of each of the crystal mixes was roasted in a batch furnace for pyrolysis. An atmosphere containing nitrogen as a carrier gas and having a steam pressure of 760 mmHg was continuously introduced and passed through the furnace. In this condition, the sample was heated at 3° C./min. and held at a temperature as shown in Table 1 for 10 minutes, and allowed to cool down in the furnace, obtaining inventive and comparative samples.

TABLE 9

| Sample | Material composition (mol %) | Atmosphere & holding temp. | X-ray diffractometry Major phase | wt % |
|---|---|---|---|---|
| 51 | $FeCl_2/FeCl_3$ = 60/40 | $N_2$ + steam 500° C./10 min. | spinel | 97.2 |
| 52 | $FeCl_2/FeCl_3$ = 60/40 | $N_2$ + steam 600° C./10 min. | spinel | 96.8 |
| 53* | $FeCl_2$ alone | $N_2$ + steam 500° C./10 min. | spinel, FeO | 78.3 |
| 54* | $FeCl_2$ alone | $N_2$ + steam 600° C./10 min. | spinel | 97.0 |
| 55 | $FeCl_2/FeCl_3$ = 60/40 solution/solution | $N_2$ + steam 600° C./10 min. | spinel | 95.3 |
| 56 | $FeCl_2/FeCl_3$ = 30/70 solution/solution | $N_2$ + steam 450° C./10 min. | spinel | 95.1 |
| 57 | $FeCl_2/FeCl_3$ = 30/70 solution/solution | $N_2$ + steam 650° C./10 min. | spinel | 93.0 |
| 58 | $FeCl_2/FeCl_3$ = 25/75 | $N_2$ + steam 500° C./10 min. | spinel | 95.3 |
| 59 | $FeCl_2/FeCl_3$ = 75/25 | $N_2$ + steam 500° C./10 min. | spinel | 98.8 |

*comparison

Separately, ferrous chloride tetrahydrate and ferric chloride were mixed in a molar ratio as shown in Table 9 and dissolved in water, obtaining mixed solution sample Nos. 55, 56, and 57 within the scope of the invention.

Using a metering pump, the mixed solution sample was fed at 25 cc/min. into a rotary kiln as shown in FIGS. 4 and where it was continuously roasted and pyrolyzed. The temperature within the kiln was set at the highest level from the first and pyrolysis reaction was effected at a predetermined temperature for a holding time as shown in Table 9.

The resulting inventive and comparative samples were examined for crystal type, magnetite phase content (wt. %), saturation magnetization σs (emu/g), coercivity Hc (Oe), static resistance (Ω), and specific surface area (m²/g). The results are shown in Tables 9 and 10.

TABLE 10

| Sample | σs (emu/g) | Hc (Oe) | Static resistance (Ω) | specific surface area (m²/g) |
|---|---|---|---|---|
| 51 | 89.0 | 104 | 3 × 10⁶ | 1.4 |
| 52 | 87.8 | 126 | 6 × 10⁶ | 1.3 |
| 53 | 71.3 | 57 | 5 × 10⁵ | 0.6 |
| 54 | 88.0 | 86 | 9 × 10⁴ | 0.5 |
| 55 | 87.2 | 138 | 7 × 10⁶ | 2.1 |
| 56 | 86.5 | 148 | 8 × 10⁷ | 1.7 |
| 57 | 85.8 | 157 | 2 × 10⁸ | 2.8 |
| 58 | 88.3 | 150 | 3 × 10⁸ | 2.7 |
| 59 | 90.3 | 98 | 2 × 10⁶ | 1.0 |

As is evident from Tables 9 and 10, when a mixture of ferrous chloride and ferric chloride was used as a starting material according to the present invention, magnetite was advantageously produced independent of whether the mixture is solid or liquid. When the compositional ratio of ferrous chloride to ferric chloride was outside the desirable range, at least one of the magnetic properties fell outside the desirable range.

Figure 11:
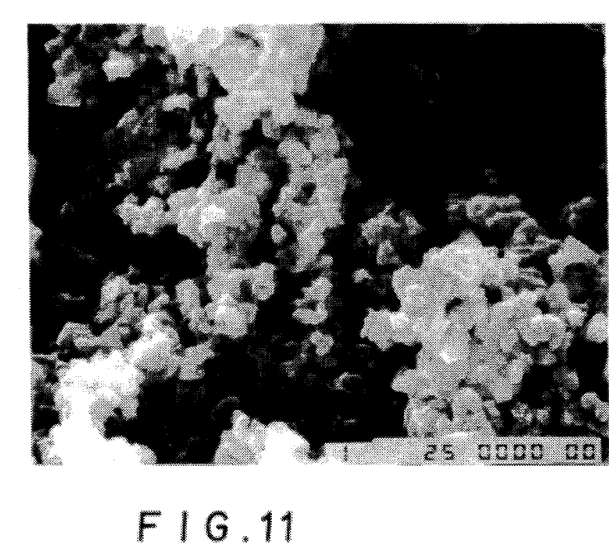
FIG. 11 is a SEM photograph of inventive sample No. 51.

FIG. 11 shows a SEM photograph of inventive sample No. 51.

Next, the magnetic powder of sample No. 51 in Example 5 and the magnetic powder of sample No. 53 in Comparative Example were formulated into a toner under the following conditions, obtaining toner Nos. 6 and 7, respectively.

Ingredients were weighed so as to give a composition of 64% of binder resin (St/Ac and PP), 35% of magnetic powder, 1% of charge control agent (TRH), and 0.5% of additive (SiO₂). They were melt kneaded in a pressure kneader, comminuted and classified, obtaining a magnetic toner. These toner powders were measured for some properties, with the results shown in Table 11.

TABLE 11

|  | Toner 6 | Toner 7 (comparison) |
|---|---|---|
| Apparent density (g/cm³) | 5.10 | 4.86 |
| Flow (g) | 0.082 | 0.094 |
| Charging quantity for 10 sec. (μc/g) | −43.9 | −27.6 |
| Tg (°C.) | 65.0 | 64.8 |
| Average particle diameter (μm) | 7.10 | 7.17 |
| σs at 5k Oe (emu/g) | 28.5 | 22.6 |
| Hc at 5k Oe (Oe) | 100 | 58 |

A commercially available electrophotographic printer (manufactured by Canon K. K.) was loaded with the above magnetic toner Nos. 6 and 7 to determine performance parameters. The results are shown in Table 12.

TABLE 12

| Properties | Unit | Toner 6 magnetite 97.2 wt % | Toner 7 (comparison) magnetite 78.3 wt % |
|---|---|---|---|
| Initial properties |  |  |  |
| Image density | — | 1.45 | 1.35 |
| Fogging | % | 0.2 | 2.5 |
| Character scattering | — | good | poor |
| Offsetting | — | good | good |
| Fixation | % | 98.0 | 84.2 |

As seen from Table 12, toner No. 6 within the scope of the present invention had satisfactory toner properties, but comparative toner No. 7 had a very low charging quantity and their image properties were undesirable with respect to fogging B.G and resolution.

We claim:

1. A method for preparing a magnetite magnetic powder comprising the steps of:

using ferrous chloride as a starting material, and roasting the starting material in a steam-containing atmosphere consisting essentially of a non-oxidizing gas and steam for pyrolysis thereof, thereby forming a magnetite magnetic powder having a saturation magnetization σs of 82 to 92 emu/g and a magnetite phase content of at least 90% by weight.

2. A method for preparing a magnetite magnetic powder according to claim 1 wherein the roasting step is effected within the range defined and encompassed by a tetragon having four points A, B, C and D given by the inlet steam pressure of the atmosphere and heat treating temperature as A: 1000° C., 760 mmHg, B: 500° C., 760 mmHg, C: 750° C., 200 mmHg, and D: 530° C., 200 mmHg.

3. A method for preparing a magnetite magnetic powder according to claim 2 wherein the roasting step is effected within the range defined and encompassed by a tetragon having four points E, F, G and H given by the inlet steam pressure of the atmosphere and heat treating temperature as E: 550° C., 760 mmHg, F: 800° C., 760 mmHg, G: 550° C., 600 mmHg, and H: 600° C., 600 mmHg.

4. A method for preparing a magnetite magnetic powder according to claim 1 wherein said ferrous chloride as the starting material is ferrous chloride in a spent hydrochloric acid pickling solution, ferrous chloride obtained by reducing a solution of ferric chloride with metallic iron, or ferrous chloride obtained by dissolving metallic iron in hydrochloric acid.

5. A method for preparing a magnetite magnetic powder according to claim 1 wherein said roasting step is effected by an atomizing roaster technique, a fluidized bed roaster technique, a tunnel kiln technique, or a rotary kiln technique.

6. A method for preparing a magnetite magnetic powder according to claim 1 wherein said magnetite magnetic powder contains up to 600 ppm of residual chlorine.

7. A magnetic toner comprising the magnetite magnetic powder prepared by the method of claim 1 and a binder resin.

8. A method for preparing a magnetite magnetic powder comprising the steps of:

using ferrous chloride as a starting material, pre-heating the starting material by heat treating said starting material at a low temperature in a non-oxidizing atmosphere, cooling said heated starting material down to or below 200° C., and exposing said heat treated and cooled starting material to an oxygen-containing atmosphere after said cooling step, and thereafter roasting the pre-treated starting material in a steam-containing atmosphere for pyrolysis thereof, thereby forming a magnetite magnetic powder having a saturation magnetization σs of 82 to 92 emu/g and a magnetite phase content of at least 90% by weight.

9. A method for preparing a magnetite magnetic powder according to claim 8 wherein the low-temperature heat treatment in the pre-treating step is at a temperature in the range of 250° to 400° C.

10. A method for preparing a magnetite magnetic powder according to claim 8 wherein the roasting temperature is in the range of 500° to 1,000° C.

11. A method for preparing a magnetite magnetic powder according to claim 8 wherein said roasting step is effected with the inlet steam pressure of the atmosphere being set at 200 to 760 mmHg.

12. A method for preparing a magnetite magnetic powder according to claim 8 wherein said atmosphere consists essentially of a non-oxidizing gas and steam.

13. A method for preparing a magnetite magnetic powder according to claim 8 wherein said ferrous chloride as the starting material is ferrous chloride in a spent hydrochloric acid pickling solution, ferrous chloride obtained by reducing a solution of ferric chloride with metallic iron, or ferrous chloride obtained by dissolving metallic iron in hydrochloric acid.

14. A method for preparing a magnetite magnetic powder according to claim 8 wherein said roasting step is effected by an atomizing roaster technique, a fluidized bed roaster technique, a tunnel kiln technique, or a rotary kiln technique.

15. A method for preparing a magnetite magnetic powder according to claim 8 wherein said magnetite magnetic powder has a specific surface area of 0.8 to 3.0 m²/g.

16. A method for preparing a magnetite magnetic powder according to claim 8 wherein said magnetite magnetic powder contains up to 600 ppm of residual chlorine.

17. A magnetic toner comprising the magnetite magnetic powder prepared by the method of claim 8 and a binder resin.

18. A method for preparing a magnetite magnetic powder comprising the steps of:

using a mixture of ferrous chloride and ferric chloride as a starting material, wherein the compositional ratio of ferrous chloride to ferric chloride ranges from 25/75 to 75/25 in molar ratio, and roasting the starting material in a steam-existing atmosphere for effecting pyrolysis reaction to form a magnetite magnetic powder.

19. A method for preparing a magnetite magnetic powder according to claim 10 wherein the roasting temperature is in the range of 430° to 800° C.

20. A method for preparing a magnetite magnetic powder according to claim 10 wherein said roasting step is effected with the inlet steam pressure of the atmosphere being set at 200 to 760 mmHg.

21. A method for preparing a magnetite magnetic powder comprising the steps of:

using a mixture of ferrous chloride and ferric chloride as a starting material, and roasting the starting material in a steam-existing atmosphere, wherein said atmosphere consists essentially of a non-oxidizing gas and steam, for effecting pyrolysis reaction to form a magnetite magnetic powder.

22. A method for preparing a magnetite magnetic powder according to claim 18 wherein said magnetite magnetic powder has a saturation magnetization σs of 82 to 92 emu/g, a Hc of 60 to 160 Oe, a specific surface area of 0.8 to 3.0 m²/g, and a resistance of at least $10^6$ Ω.

23. A magnetic toner comprising the magnetite magnetic powder prepared by the method of claim 18 and a binder resin.

* * * * *